(12) United States Patent
Jung et al.

(10) Patent No.: US 11,749,926 B2
(45) Date of Patent: Sep. 5, 2023

(54) ELECTRICAL CONNECTION DEVICE FOR VEHICLE

(71) Applicants: Hyundai Motor Company, Seoul (KR); Kia Corporation, Seoul (KR); Korea Electric Terminal Co., Ltd., Incheon (KR); THN Corporation, Daegu (KR)

(72) Inventors: Yun Jae Jung, Suwon-si (KR); Tae Hong Yoon, Suwon-si (KR); Yong Han Song, Siheung-si (KR)

(73) Assignees: Hyundai Motor Company, Seoul (KR); Kia Corporation, Seoul (KR); Korea Electric Terminal Co., Ltd., Incheon (KR); THN Corporation, Daegu (KR)

( * ) Notice: Subject to any disclaimer, the term of this patent is extended or adjusted under 35 U.S.C. 154(b) by 35 days.

(21) Appl. No.: 17/392,575

(22) Filed: Aug. 3, 2021

(65) Prior Publication Data

US 2022/0209450 A1 Jun. 30, 2022

(30) Foreign Application Priority Data

Dec. 28, 2020 (KR) ........................ 10-2020-0184118

(51) Int. Cl.
*H01R 13/187* (2006.01)
*B60R 16/02* (2006.01)

(52) U.S. Cl.
CPC ........... *H01R 13/187* (2013.01); *B60R 16/02* (2013.01); *H01R 2201/26* (2013.01)

(58) Field of Classification Search
CPC .... H01R 13/187; H01R 13/052; H01R 13/15; H01R 2201/26; B60R 16/02
See application file for complete search history.

(56) References Cited

U.S. PATENT DOCUMENTS

| | | | | |
|---|---|---|---|---|
| 3,845,451 | A * | 10/1974 | Neidecker | H01R 13/28 439/787 |
| 4,753,616 | A * | 6/1988 | Molitor | H01R 13/17 439/825 |
| 5,261,840 | A * | 11/1993 | Benz | H01R 4/4881 439/843 |
| 5,383,800 | A * | 1/1995 | Saka | H01H 85/2035 439/852 |

(Continued)

*Primary Examiner* — Thanh Tam T Le
(74) *Attorney, Agent, or Firm* — Slater Matsil, LLP

(57) ABSTRACT

An embodiment electrical connection device for a vehicle includes a male connector housing having a blade terminal mounting portion, a female connector housing to couple to the male connector housing and having a tab terminal mounting portion, a blade terminal mounted in the blade terminal mounting portion, and a tab terminal mounted in the tab terminal mounting portion to connect to the blade terminal when the male connector housing and the female connector housing are coupled to each other. An embodiment blade terminal includes a terminal body having a first connection portion and a contact spring inserted into an inner side of the first connection portion to connect the terminal body and the tab terminal to each other by being brought into contact with the tab terminal when the tab terminal is inserted into the inner side of the first connection portion.

17 Claims, 8 Drawing Sheets

(56) References Cited

U.S. PATENT DOCUMENTS

| | | | | |
|---|---|---|---|---|
| 5,431,576 A * | 7/1995 | Matthews | ........... | H01R 13/6315 |
| | | | | 439/247 |
| 5,588,884 A * | 12/1996 | Rudoy | ................... | H01R 31/02 |
| | | | | 439/787 |
| 5,865,654 A * | 2/1999 | Shimirak | ............... | H01R 24/44 |
| | | | | 439/654 |
| 6,089,929 A * | 7/2000 | Sloey | ................... | H01R 13/187 |
| | | | | 439/845 |
| 6,227,868 B1 * | 5/2001 | Wlodarski | ............ | H01R 24/542 |
| | | | | 439/63 |
| 6,287,156 B1 * | 9/2001 | Swan | ................... | H01R 13/187 |
| | | | | 439/845 |
| 6,416,340 B2 * | 7/2002 | Schaefer | .............. | H01R 13/187 |
| | | | | 439/224 |
| 6,692,316 B2 * | 2/2004 | Hsieh | ................. | H01R 13/5205 |
| | | | | 439/224 |
| 7,150,660 B2 * | 12/2006 | Allgood | ............... | H01R 13/113 |
| | | | | 439/852 |
| 7,766,706 B2 * | 8/2010 | Kawamura | .......... | H01R 13/113 |
| | | | | 439/833 |
| 8,038,488 B2 * | 10/2011 | Mukuno | .............. | H01R 13/187 |
| | | | | 439/845 |
| 8,128,441 B2 * | 3/2012 | Mukuno | .............. | H01R 13/055 |
| | | | | 439/845 |
| 8,388,389 B2 * | 3/2013 | Costello | ................. | H01R 13/26 |
| | | | | 439/637 |
| 8,827,754 B2 * | 9/2014 | Lee | ...................... | H01R 13/187 |
| | | | | 439/845 |
| 10,230,191 B2 * | 3/2019 | Lui | ...................... | H01R 13/187 |
| 10,855,014 B1 * | 12/2020 | Wu | ...................... | H01R 13/187 |

* cited by examiner

ELECTRICAL CONNECTION DEVICE FOR VEHICLE

CROSS-REFERENCE TO RELATED APPLICATIONS

This application claims the benefit of Korean Patent Application No. 10-2020-0184118, filed Dec. 28, 2020, which application is hereby incorporated herein by reference.

TECHNICAL FIELD

The present disclosure relates to an electrical connection device for a vehicle.

BACKGROUND

Generally, vehicles are equipped with various electric and electronic devices in order to enhance performance and improve convenience. Such electrical and electronic devices are electrically connected to other devices through cables and connectors. The connectors serve to carry current and electrical signals between a power source and a device and between devices.

In the case of a high-power connector for a vehicle, it is configured to transmit relatively high power in a vehicle and includes a connector housing configured to accomplish a mechanical connection of the connector and a connector terminal configured to accomplish an electrical connection of the connector.

The connector terminal is configured to have an annular shape in order to transmit high voltage and high current. The connector terminal is provided with an annular contact spring therein for a stable connection with a mating connector terminal.

A circular connector terminal applied to a conventional high power connector has to increase a sectional area when a capacity of a current applied thereto increases, so that a structural radius size increases, and accordingly, the size of the high power connector increases to be inefficient.

In addition, there is a problem that the more the size of the high-power connector increases, the more it is likely that a finger safety structure for worker safety is not satisfied. For example, the more the size of the high-power connector increases, the more likely it is that the operator's finger comes into contact with the connector, and accordingly, the risk of electric shock to the operator increases when the connector is energized.

The foregoing is intended merely to aid in the understanding of the background of the present disclosure, and is not intended to mean that the present disclosure falls within the purview of the related art that is already known to those skilled in the art.

SUMMARY

The present disclosure relates to an electrical connection device for a vehicle. Particular embodiments relate to an electrical connection device for a vehicle capable of maintaining a stable electrical connection state even when the vehicle is vibrated.

Embodiments of the present disclosure have been made keeping in mind problems occurring in the related art, and an embodiment of the present disclosure provides an electrical connection device for a vehicle capable of solving problems of a conventional annular connector and allowing a stable electrical connection to be structurally made.

In order to achieve the above embodiment, there may be provided an electrical connection device for a vehicle, the device including a male connector housing formed with a blade terminal mounting portion, a female connector housing configured to couple to the male connector housing and formed with a tab terminal mounting portion, a blade terminal mounted in the blade terminal mounting portion, and a tab terminal mounted in the tab terminal mounting portion and configured to connect to the blade terminal when the male connector housing and the female connector housing are coupled to each other. The blade terminal may include a terminal body formed with a first connection portion configured to accomplish electrical connection with the tab terminal and a contact spring assembled in a state of being inserted into an inner side of the first connection portion and configured to connect the terminal body and the tab terminal to each other by being brought into contact with the tab terminal when the tab terminal is inserted into the inner side of the first connection portion.

Specifically, the contact spring may include a fixed contact portion configured to be elastically brought into contact with an inner circumferential surface of the first connection portion in a state of being disposed at the inner side of the first connection portion, and a pair of movable contact portions integrally formed on upper and lower portions, respectively, of the fixed contact portion and configured to be elastically brought into contact with an outer circumferential surface of the tab terminal in a state of being pressed by the outer circumferential surface of the tab terminal inserted into the inner side of the first connection portion.

Each of the movable contact portions may include a plurality of contact beams having front ends integrally formed with the fixed contact portion, respectively, and rear ends connected to each other, wherein each of the contact beams may have a front contact portion and a rear contact portion formed by bending a central portion thereof, wherein the front contact portion and the rear contact portion may be protrudingly formed convexly toward an opposite side of the inner circumferential surface of the first connection portion at a center portion of the contact beam and each elastically presses the outer circumferential surface of the tab terminal by elastic restoring force generated while being pressed by the outer circumferential surface of the tab terminal that is being inserted into the inner side of the first connection portion.

The rear contact portion may be disposed at a regular distance at a rear side of the front contact portion, and when being inserted into the inner side of the first connection portion, the tab terminal may be brought into contact with the front contact portion and then with the rear contact portion.

The fixed contact portion may include an upper plate configured to be elastically brought into contact with an upper inner circumferential surface of the first connection portion, a lower plate configured to be elastically brought into contact with a lower inner circumferential surface of the first connection portion, and a center plate extendedly formed by being bent in an arc shape at a rear end of the upper plate and a rear end of the lower plate, thereby connecting the rear end of the upper plate and the rear end of the lower plate to each other.

The first connection portion may be formed to have a U-shaped cross section and include a front opening portion at a front surface and a pair of side opening portions at side surfaces, the front opening portion being configured to receive the tab terminal therein.

Fixing grooves disposed on opposite side opening portions may be formed on the side surfaces of the first connection portion, respectively, and side surface fixing portions configured to be correspondingly inserted into and assembled with the fixing grooves may be formed on the upper plate and the lower plate, respectively.

Front fixing portions configured to be hooked by the front surface of the first connection portion, thereby being brought into close contact with the same may be formed on the upper plate and the lower plate, respectively, wherein the front fixing portions of the upper plate and the front fixing portions of the lower plate may be disposed on opposite sides of the front opening portion, respectively.

Upper stoppers extendedly formed by being bent in downward directions may be formed on a left side surface and a right side surface of the upper plate, respectively, and lower stoppers extendedly formed by being bent in upward directions may be formed on the left side surface and the right side surface of the lower plate, respectively.

The terminal body may include a central body portion and the first connection portion and a second connection portion formed on opposite sides of the central body portion, wherein the second connection portion may be disposed at a position opposite to the first connection portion.

The second connection portion may be formed in a same shape as the first connection portion, with a contact spring mounted in an inside of the second connection portion.

As described above, through means of solving problems, the electrical connection device for a vehicle according to embodiments of the present disclosure can provide the following main effects.

First, the blade terminal and the tab terminal are connected in a predetermined multiple connection structure using a contact spring, so it is possible to maintain a stable electrical connection state even when the vehicle is in high vibration conditions.

Second, by using a blade-type terminal, it is possible to reduce an increase in the size of the terminal caused by an increase in the current-carrying capacity compared to a related art.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
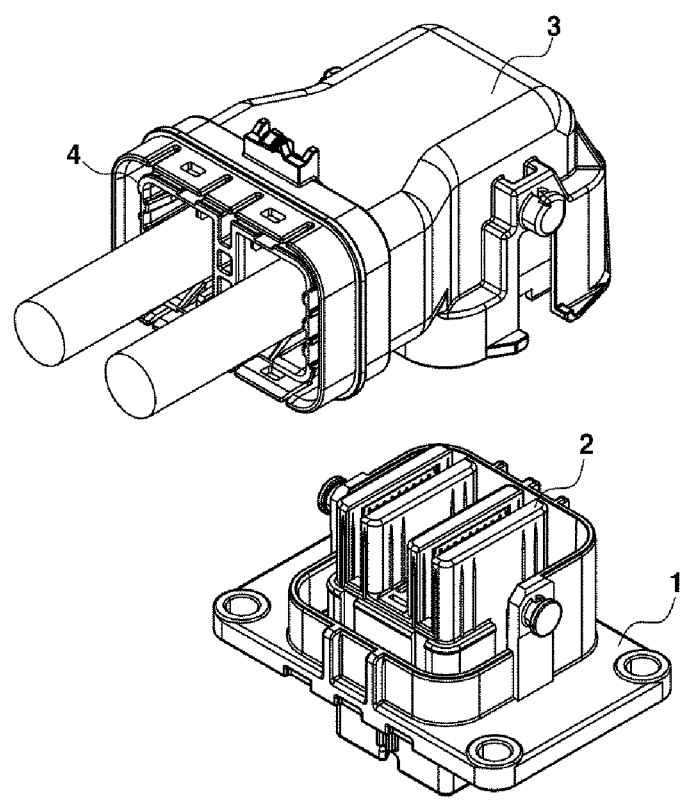
FIG. 1 is an exploded perspective view showing an electrical connection device for a vehicle according to an embodiment of the present disclosure.
Figure 2:
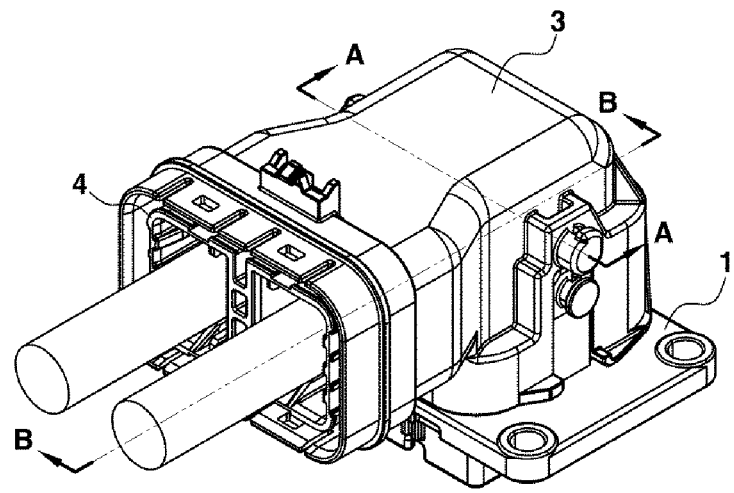
FIG. 2 is a combined perspective view showing the electrical connection device according to an embodiment of the present disclosure.
Figure 3A:
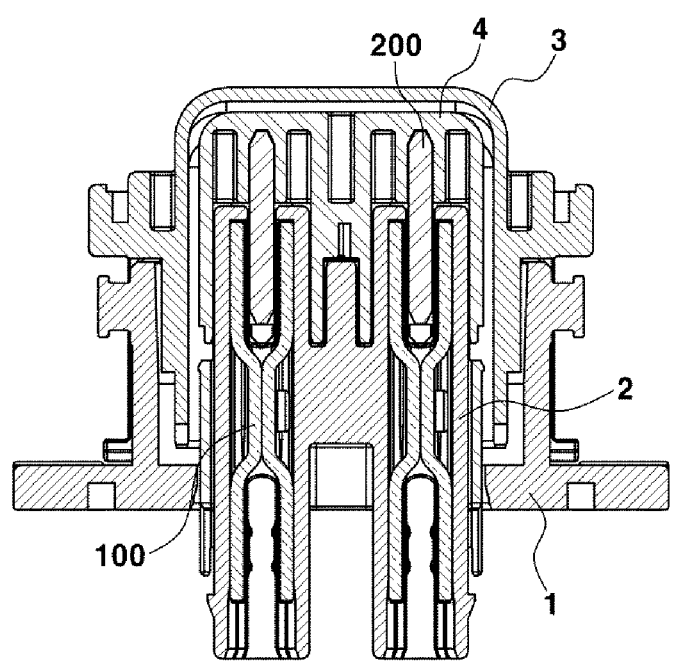
FIG. 3A is a sectional view taken along line A-A in FIG. 2.
Figure 3B:
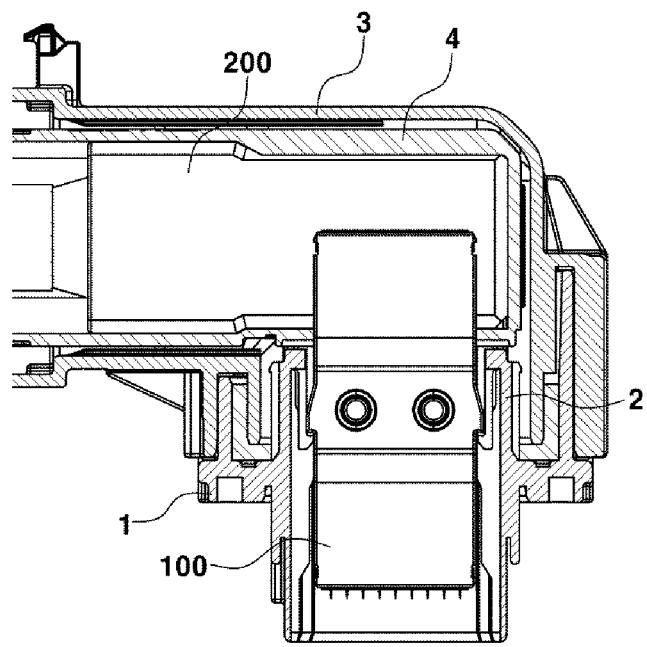
FIG. 3B is a sectional view taken along line B-B in FIG. 2.

Hereinbelow, exemplary embodiments of the present disclosure will be described in detail with reference to the accompanying drawings. Matters expressed in the accompanying drawings are schematic drawings for easy explanation of embodiments of the present disclosure and may be different from an actual implementation form.

Throughout the specification, when a part "includes" a certain component, it means that other components may be further included rather than excluding other components unless specifically stated to the contrary.

The electrical connection device for a vehicle according to embodiments of the present disclosure is a type of connector assembly including a male connector and a female connector, the electrical connection device for a vehicle including, as shown in FIGS. 1 to 3B: a male connector housing 1 equipped with a blade terminal 100; and a female connector housing 3 equipped with a tab terminal 200.

The male connector housing 1 is provided with a blade terminal mounting portion 2 configured to mount the blade terminal 100, and the female connector housing 3 is provided with a tab terminal mounting portion 4 configured to mount the tab terminal 200.

The blade terminal 100 is inserted and mounted inside the blade terminal mounting portion 2 and may be mounted and fixed to the blade terminal mounting portion 2 in a general terminal mounting method of a connector, for example, such as bonding or press fitting.

The tab terminal 200 is inserted and mounted inside the tab terminal mounting portion 4 and, like the blade terminal 100, may be mounted and fixed to the tab terminal mounting portion 4 in a general terminal mounting method of a connector, for example, bonding or press fitting.

The tab terminal 200 is electrically connected to the blade terminal 100 when the male connector housing 1 and the female connector housing 3 are coupled to each other.

Figure 4:
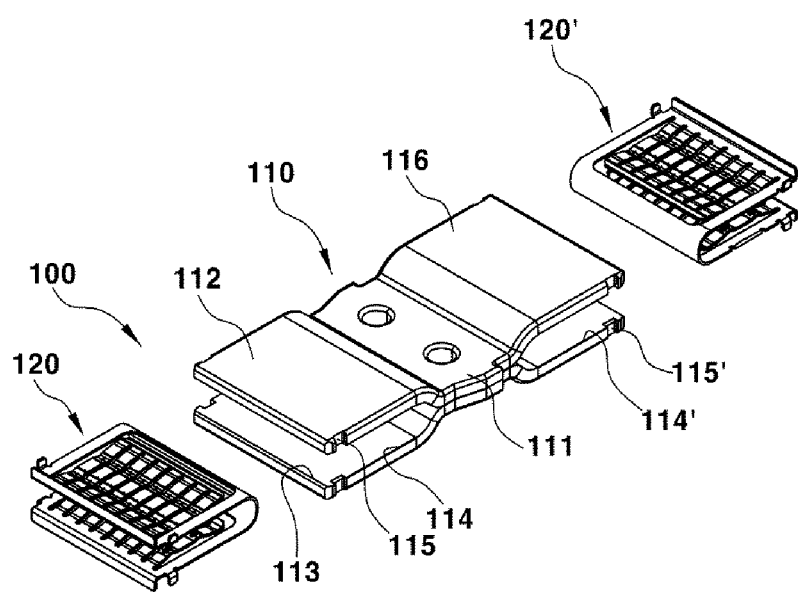
FIG. 4 is an exploded perspective view showing a blade terminal in a configuration of the electrical connection device according to an embodiment of the present disclosure.
Figure 5:
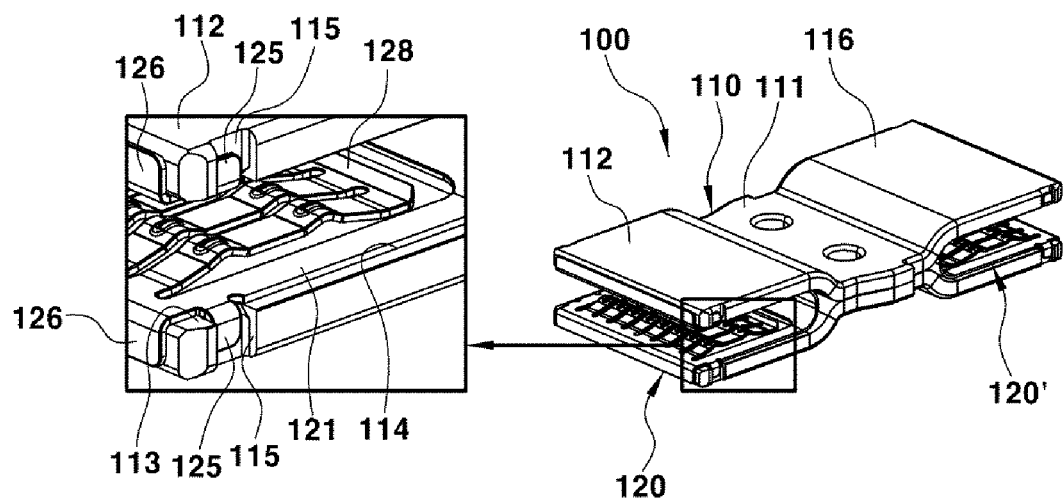
FIG. 5 is a combined perspective view showing the blade terminal according to an embodiment of the present disclosure.

As shown in FIGS. 4 and 5, the blade terminal wo includes a terminal body no and contact springs 120 mounted in the terminal body 110.

The terminal body no includes a central body portion in and a first connection portion 112 and a second connection portion 116 integrally formed on opposite sides of the central body portion 111. Such a terminal body no may be manufactured using an elastic body in which the central portions of the two plate members are tightly joined by a clinching method.

The first connection portion 112 is a part configured to accomplish an electrical connection with the tab terminal 200 and may be formed to have an approximately U-shaped cross section, and specifically formed in a U-shaped structure with three surfaces open.

More specifically, the first connection portion 112 may include a front opening portion 113 and a pair of side opening portions 114, the front opening portion 113 being configured to receive the tab terminal 200 therein.

The front opening portion 113 is a portion in which a central portion of a front surface of the first connection portion 112 is open, and the side opening portions 114 are portions in which a central portion of the left surface and a central portion of the right surface of the first connection portion 112 are open, respectively.

Figure 6:
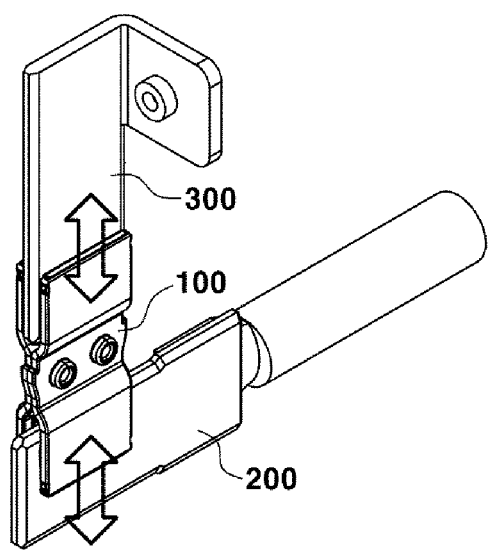
FIG. 6 is a perspective view showing a combined state of the blade terminal and a tab terminal according to an embodiment of the present disclosure.
Figure 7:
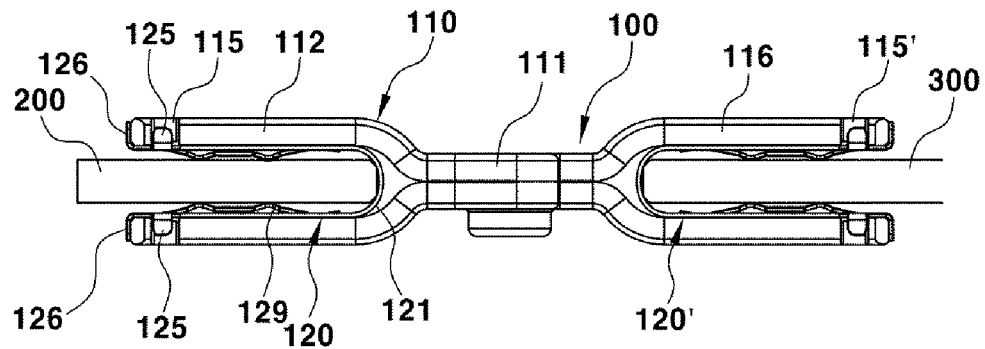
FIG. 7 is a side view showing the combined state of the blade terminal and the tab terminal according to an embodiment of the present disclosure.

As shown in FIGS. 6 and 7, the contact spring 120 is assembled in a state of being inserted into the first connection portion 112 and comes in contact with the tab terminal 200 when the tab terminal 200 is inserted into the first connection portion 112, thereby serving to allow the terminal body no and the tab terminal 200 to be brought in contact with each other.

Figure 8:
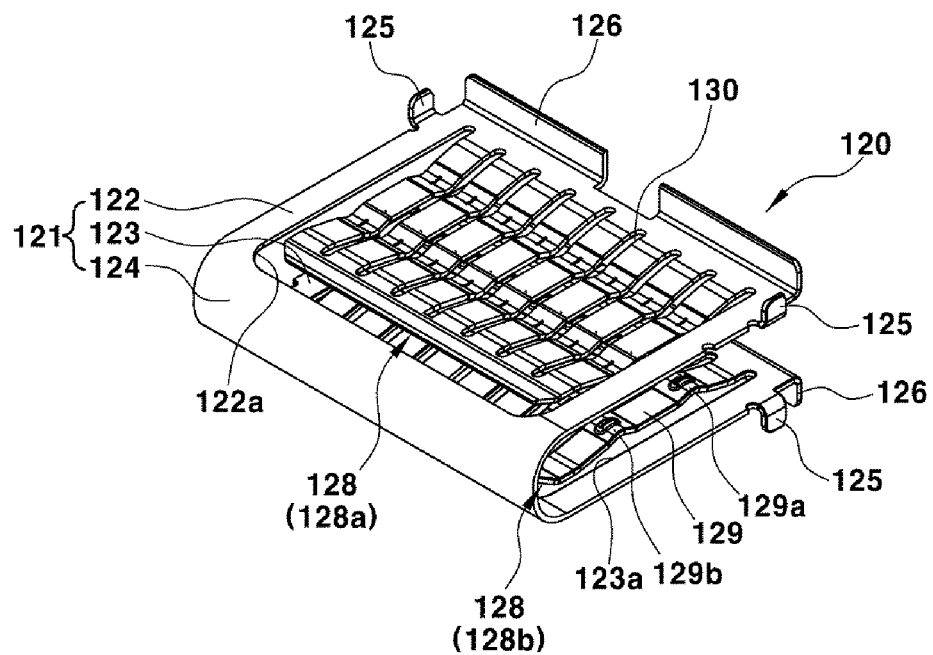
FIG. 8 is a perspective view showing a contact spring in the configuration of the blade terminal according to an embodiment of the present disclosure.
Figure 9:
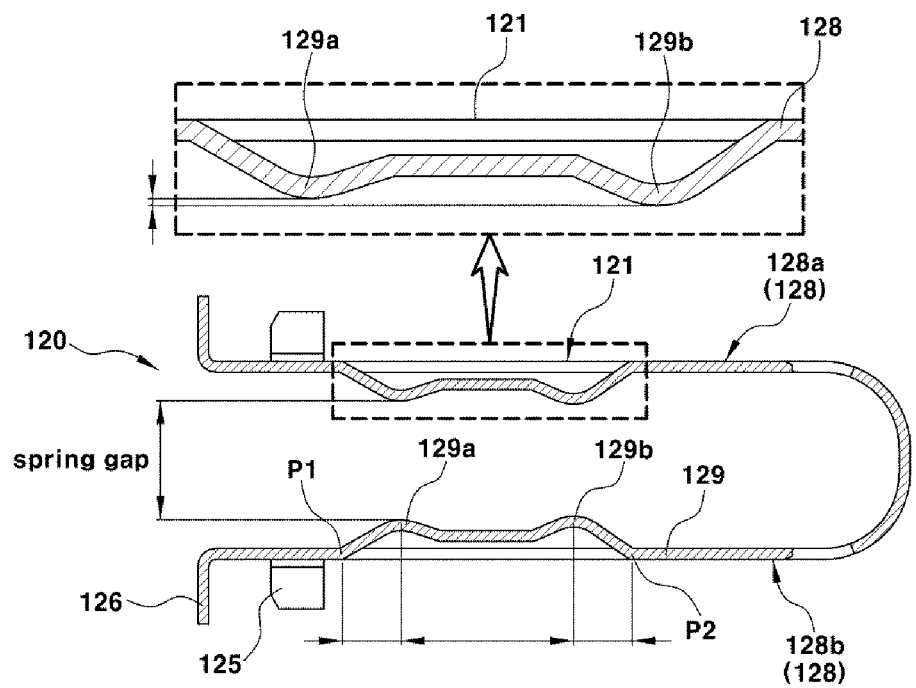
FIG. 9 is a side view showing the contact spring according to an embodiment of the present disclosure.

As shown in FIGS. 8 and 9, the contact spring 120 may include a fixed contact portion 121 and a pair of movable contact portions 128.

The fixed contact portion 121 is a part that is in contact with the inner circumferential surface of the first connection portion 112 in a state of being disposed inside the first connection portion 112 of the terminal body no, and the movable contact portions 128 are parts that are each integrally formed with the upper side (that is, upper plate) and the lower side (that is, lower plate) of the fixed contact portion 121, thereby being elastically brought into contact with the outer peripheral surface of the tab terminal 200 inserted into the inner side of the first connection portion 112.

Figure 10:
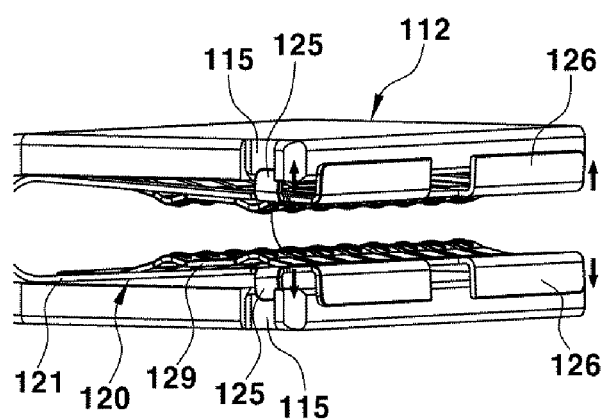
FIG. 10 is a view showing a state in which the contact spring is assembled to a first connection portion of a terminal body in the configuration of the blade terminal according to an embodiment of the present disclosure.
Figure 11:
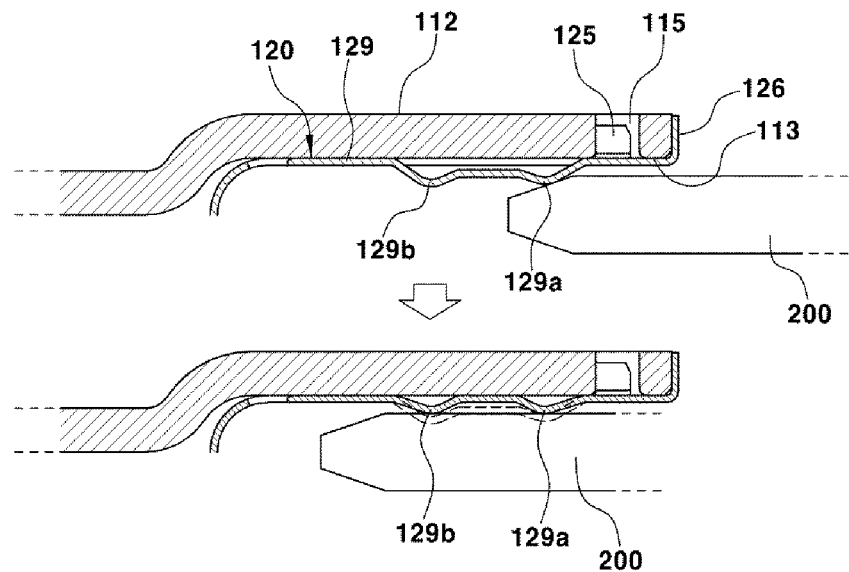
FIG. 11 is a view showing a connection sequence of the blade terminal and the tab terminal according to an embodiment of the present disclosure.

The fixed contact portion 121 may be formed to have an approximately U-shaped cross section and may be inserted in a state of being compressed by being slightly pressed when assembled by being inserted into the inner side of the first connection portion 112 as shown in FIG. 10. Accordingly, the fixed contact portion 121 may more stably adhere closely to the inner circumferential surface of the first connection portion 112 by elastic restoring force.

Specifically, the fixed contact portion 121 may include an upper plate 122, a lower plate 123, and a center plate 124 integrally connecting the upper plate 122 and the lower plate 123 therewith.

The upper plate 122 is a part that elastically comes into close contact with the upper inner circumferential surface of the first connection portion 112 and is provided, at a central portion thereof, with an upper opening portion 122a formed by the upper movable contact portion 128a that stretches from a front end thereof integrally formed with the upper plate 122. At an inner side of the upper opening portion 122a, the upper movable contact portion 128a may be disposed so as to be stretchable without interference with the upper plate 122.

The lower plate 123 is a part that elastically comes into close contact with the lower inner circumferential surface of the first connection portion 112 and is provided, at a central portion thereof, with a lower opening portion 123a, formed by the lower movable contact portion 128b that stretches from a front end thereof integrally formed with the lower plate 123. At an inner side of the lower opening portion 123a, the lower movable contact portion 128b may be disposed so as to be stretchable without interference with the lower plate 123.

The center plate 124 is a portion extendedly formed from the rear end of the upper plate 122 and the rear end of the lower plate 123, may integrally connect the rear end of the upper plate 122 and the rear end of the lower plate 123, and may be formed in a bent form in an arc shape in order to efficiently restore the elasticity of the fixed contact portion 121 assembled to the first connection portion 112 of the terminal body no. More specifically, the center plate 124 may be formed to have a U-shaped cross section.

The movable contact portion 128 is elastically brought into contact with the outer peripheral surface of the tab terminal 200 by the elastic restoring force generated while being pressed by the outer circumferential surface of the tab terminal 200 when the tab terminal 200 is inserted into the inner side of the first connection portion 112.

The movable contact portion 128 may have the front end integrally formed with the fixed contact portion 121 and at the same time have a rear end and side ends thereof separated from the fixed contact portion 121.

Specifically, the upper movable contact portion 128a may be formed by being stretched from the front end thereof integrally formed with the upper plate 122, and the lower movable contact portion 128b may be formed by being stretched from the front end thereof integrally formed with the lower plate 123.

The movable contact portion 128 may include a plurality of contact beams 129 having front ends integrally formed with the fixed contact portion, respectively, and rear ends connected to each other.

The plurality of contact beams 129 may be arranged side by side in a direction of right and left, and in this case, a slot 130 may be provided between the plurality of contact beams 129, respectively. The contact beams 129 may be disposed at a regular distance from each other by the slot 13o. Here, the direction of right and left may be a direction perpendicular to an insertion direction of the tab terminal 200 inserted into the first connection portion 112 of the terminal body 110.

Each of the contact beams 129 has a two-row contact structure against the tab terminal 200.

Specifically, each of the contact beams 129 has a front contact portion 129a and a rear contact portion 129b formed by bending a central portion thereof. The front contact portion 129a and the rear contact portion 129b are each protrudingly formed convexly toward an opposite side of the inner circumferential surface of the first connection portion 112. At this time, the central portion of each contact beam 129 may have an approximately W-shaped sectional structure by being provided with the front contact portion 129a and the rear contact portion 129b.

The front contact portion 129a elastically presses the outer circumferential surface of the tab terminal 200 by the elastic restoring force generated while being pressed by the outer circumferential surface of the tab terminal 200 that is being inserted into the inner side of the first connection portion 112.

In the same manner, the rear contact portion 129b elastically presses the outer circumferential surface of the tab terminal 200 by the elastic restoring force generated while being pressed by the outer circumferential surface of the tab terminal 200 that is being inserted into the inner side of the first connection portion 112.

Therefore, each of the contact beams 129 comes into contact with, while pressing twice, the outer peripheral surface of the tab terminal 200.

At this time, the rear contact portion 129b is disposed at a regular distance at a rear side of the front contact portion 129a, and the tab terminal 200, when being inserted into the inner side of the first connection portion 112, is brought into contact with the front contact portion 129a and then with the rear contact portion 129b.

In addition, the contact beams 129 are simultaneously brought into contact with the outer circumferential surface of the tab terminal 200, but are individually pressed and unfolded by the tab terminal 200, and elastically maintain a contact state with the tab terminal 200, respectively.

More specifically, the front contact portion 129a and the rear contact portion 129b are arranged to be spaced apart from each other with the insertion direction of the tab terminal 200 as a reference. The front contact portion 129a is disposed in front of the rear contact portion 129b with the insertion direction of the tab terminal 200 as a reference.

Therefore, when being inserted into the first connection portion 112 in which the contact spring 120 is assembled, as shown in FIG. 1i, the tab terminal 200 is first brought into contact with the front contact portion 129a disposed in the front and then brought into contact with the rear contact portion 129b disposed at the rear.

As in a general connector assembly, the above-described electrical connection device for a vehicle also includes an interlock terminal of a male connector and an interlock terminal of a female connector. In the case of the male connector interlock terminal and the female connector interlock terminal, both the connector interlock terminals are separated so as to maintain a certain distance from each other at a moment when each of the front contact portions 129a is brought into contact with the tab terminal 200, thereby preventing overcurrent from being generated when current is applied.

In addition, the contact spring 120 configured as described above is formed in a structure that has no plastic deformation of the movable contact portion 128 and the fixed contact portion 121 when the movable contact portion 128 is brought into contact with the tab terminal 200. In other words, the contact spring 120 is formed in a structure in which plastic deformation does not occur due to the connection of the movable contact portion 128 to the tab terminal 200.

Accordingly, when the movable contact portion 128 is mechanically and physically separated from the tab terminal 200, the contact spring 120 is restored to its original shape.

In order to secure shape restoration and connection stability of the contact spring 120, as shown in FIG. 9, the contact spring 120 may have predetermined values each set for the following: a distance between the upper front contact portion 129a and the lower front contact portion 129a; a distance between the upper rear contact portion 129b and the lower rear contact portion 129b; a distance between the front contact portion 129a and the rear contact portion 129b; a distance between the front contact portion 129a and the support point P1 of the front contact portion 129a; a distance between the rear contact portion 129b and the support point P2 of the rear contact portion 129b; and a height difference between the front contact portion 129a and the rear contact portion 129b.

In this case, the heights of the front contact portion 129a and the rear contact portion 129b may be determined with the inner circumferential surface of the first connection portion 112 as a reference. In the case of the front contact portion 129a and the rear contact portion 129b of the upper movable contact portion 128a, the heights may be set with the upper inner circumferential surface of the first connection portion 112 as a reference, and in the case of the front contact portion 129a and the rear contact portion 129b of the lower movable contact portion 128b, the heights may be set with the lower inner circumferential surface of the first connection portion 112 as a reference.

The front contact portion 129a may be formed to have a smaller height than the rear contact portion 129b. That is, the rear contact portion 129b may be formed to have a greater height than the front contact portion 129a. In this case, the height difference between the front contact portion 129a and the rear contact portion 129b may be determined to be a regular value.

Spring properties may be improved by adjusting design factors of the contact spring 120 as described above, and the spring properties of the contact spring 120 may be further improved by further adjusting the number of contact beams 129, the height of the contact spring 120 in the vertical direction, and the like with respect to the width of the movable contact portion 128.

In particular, the front contact portion 129a is formed to have the smaller height than the rear contact portion 129b, so that the tab terminal 200 is brought into contact with the front contact portion 129a and then the rear contact portion 129b. Accordingly, the contact pressure of the movable contact portion 128 with respect to the outer circumferential surface of the tab terminal 200 increases, and a balance of the insertion and extraction force of the tab terminal 200 against the contact spring 120 is improved. As a result, the connection stability of the contact spring 120 to the tab terminal 200 is improved to maintain a stable connection state.

Meanwhile, as shown in FIGS. 4 to 7, fixing grooves 115 are formed on side surfaces of the first connection portion 112, and side surface fixing portions 125 configured to be correspondingly inserted into the fixing grooves 115 are respectively provided on the upper plate 122 and the lower plate 123 of the contact spring 120.

The fixing grooves 115 are formed on opposite side surfaces of an upper side and a lower side of the first connection portion 112, respectively, and thus the first connection portion 112 may have a total of four fixing grooves 115.

The fixing groove 115 may be disposed on opposite sides of the side opening portions 114 of the first connection portion 112 by being provided on the side surfaces of the first connection portion 112.

The side surface fixing portions 125 may be formed on the left and right side surfaces of the upper plate 122 and the left and right side surfaces of the lower plate 123, respectively, may extend upward from the side surfaces of the upper plate 122 and be formed to be bent with respect to the side surfaces of the upper plate 122, and may extend downward from the side surfaces of the lower plate 123 and be formed to be bent with respect to the side surfaces of the lower plate 123.

The side surface fixing portions 125, when the contact spring 120 is completely inserted into the first connection portion 112, may be simultaneously inserted into and fixed to each fixing groove 115 formed on the upper side surfaces and the lower side surfaces, respectively, of the first connection portion 112.

The contact spring 120 may be inserted in a state of being compressed into the inner side of the first connection portion 112, and as the contact spring 120 is restored to its original shape at the time period of the completion of insertion thereof, the side surface fixing portions 125 may be assembled in the grooves 115, respectively.

Such side surface fixing portions 125 may prevent the contact spring 120 from being separated from the first connection portion 112.

In addition, the upper plate 122 and the lower plate 123 may be formed with front fixing portions 126, respectively. The front fixing portions 126 of the upper plate 122 may extend upward from the front surface of the upper plate 122 and be formed to be bent with respect to the front surface of the upper plate 122, and the front fixing portions 126 of the lower plate 123 may extend downward from the front surface of the lower plate 123 and be formed to be bent with respect to the front surface of the lower plate 122.

Therefore, when the contact spring 120 is completely inserted into the first connection portion 112, the front fixing portions 126 may be hooked to each of the upper and lower front surfaces of the first connection portion 112 to make close contact. That is, the front fixing portions 126 may be locked while being in close contact with the upper and lower front surfaces of the first connection portion 112.

When the contact spring 120 is completely inserted into the first connection portion 112, the front fixing portions 126 of the upper plate 122 and the front fixing portions 126 of the lower plate 123 may be disposed on opposite sides of the front opening portion 113 of the first connection portion 112, respectively.

In addition, as shown in FIGS. 4 to 7, the second connection portion 116 of the terminal body no may be formed extending at an end of the central body portion in and disposed at a position opposite the first connection portion 112.

The second connection portion 116 is a part into which a bus-bar 300 to be connected to the tab terminal 200 is inserted and may be electrically connected to the electric and electronic device through the bus-bar 300 assembled to the male connector housing 1. In this case, the electric and electronic device may be one of electric and electronic devices provided in the vehicle.

In order to stably maintain a connection state with the bus-bar 300, the second connection portion 116 may be assembled with a contact spring 120' similarly to the first connection portion 112. The contact spring 120' is formed in the same structure as the contact spring 120 described above, and may perform the same function.

In this case, the second connection portion 116 may be formed in the same structure as the first connection portion 112, and may be formed to be symmetrical with the first connection portion 112 with respect to the central body portion 111. The second connection portion 116 may perform the same function as the first connection portion 112. The second connection portion 116 has side opening portions 114' and fixing grooves 115'.

Here, the second connection portion 116 may be formed to have the upper plate 122 and the lower plate 123 of the same structure, and the upper plate 122 and the lower plate 123 may be formed to achieve symmetry with the center plate 124 as a reference.

The electrical connection device configured as described above may maintain a stable electrical connection state between the tab terminal 200 and the terminal body no by the contact spring 120 even under a condition in which a large vibration of the vehicle occurs.

Here, an elastic body having conductivity is used in the terminal body no and the tab terminal 200 as well as the contact spring 120.

In addition, as the terminal body no has a U-shaped cross sectional structure having the front opening portion 113 and side opening portions 114, the electrical connection device is capable of having a stable connection with the tab terminal 200, even if the arrangement of the female connector housing 3 with respect to the male connector housing 1 is changed, and coping with various types of connector connection structures.

On the other hand, when the tab terminal 200 and the blade terminal 100 are connected in an incomplete state, plastic deformation may occur in the contact spring 120 as the movable contact portion 128 is excessively pressed by the tab terminal 200. For example, if the coupling between the male connector housing 1 and the female connector housing 3 is incomplete, the tab terminal 200 and the blade terminal 100 may be connected in an incomplete state.

Figure 12:
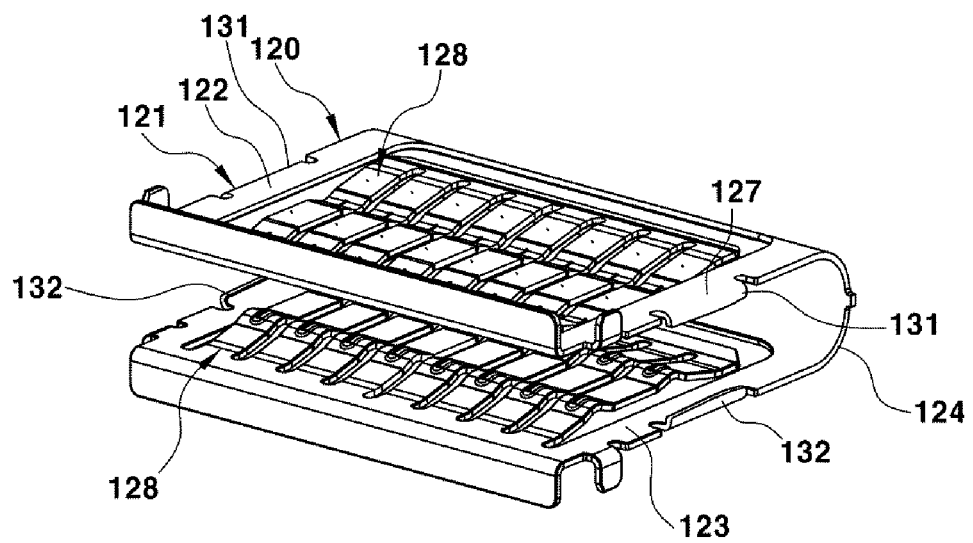
FIG. 12 is a perspective view showing a contact spring according to another embodiment of the present disclosure.
Figure 13:
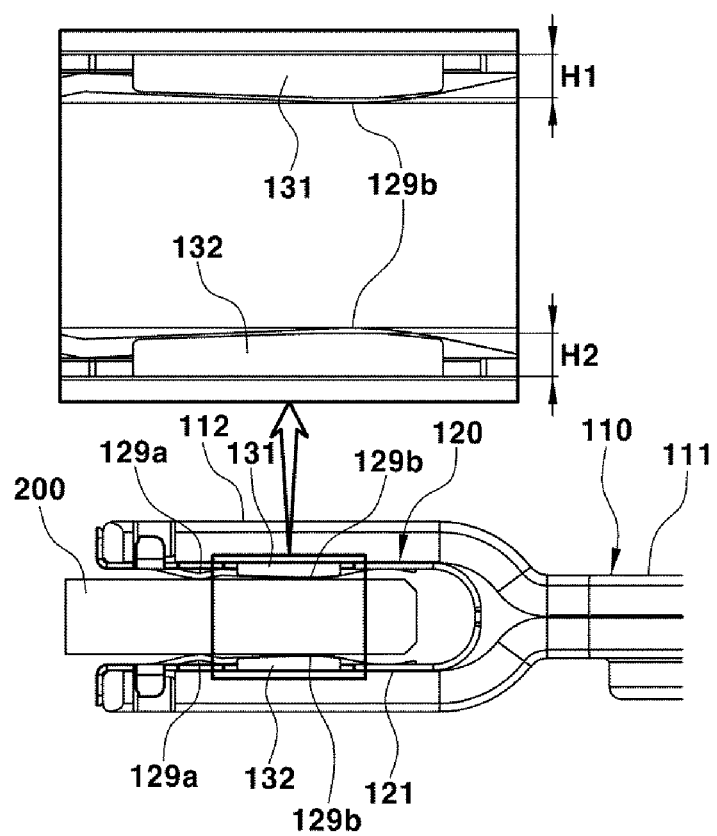
FIG. 13 is a side view showing a first connection portion of a blade terminal provided with a stopper as a blade terminal according to another embodiment of the present disclosure.

In order to prevent plastic deformation of the movable contact portion 128 due to incomplete connection between the tab terminal 200 and the blade terminal 100, as shown in FIGS. 12 and 13, upper stoppers 131 and lower stoppers 132 may be formed at the contact spring 120.

The stoppers 131 and 132 are formed on the side surfaces of the contact spring 120 to prevent plastic deformation of the movable contact portion 128.

Specifically, the upper stoppers 131 are formed on the left side and the right side of the upper plate 122, and the lower stoppers 132 are formed on the left side and the right side of the lower plate 123.

For example, the upper stoppers 131 may be extendedly formed on the left side surface and the right side surface of the upper plate 122 in a form bent 90° downward, respectively, and the lower stoppers 132 may be extendedly formed on the left side surface and the right side surface of the lower plate 123 in a form bent 90° upward, respectively.

The upper stoppers 131 and the lower stoppers 132 are selectively brought into contact with the upper and lower surfaces of the tab terminal 200 inserted into the contact spring 120, and thus the front contact portions 129a and the rear contact portions 129b of the movable contact portion 128 are prevented from being excessively pressed. The upper stoppers 131 prevent over-deformation of the front contact portion 129a and the rear contact portion 129b by bringing the lower ends thereof into contact with the upper surface of the tab terminal 200, and the lower stoppers 132 prevent over-deformation of the front contact portion 129a and the rear contact portion 129b by bringing the upper ends thereof into contact with the lower surface of the tab terminal 200.

When deformed by being pressed by the tab terminal 200, the front contact portions 129a and the rear contact portions 129b are pressed only to the lower position of the upper stoppers 131 and the upper position of the lower stoppers 132. Therefore, the heights H1 and H2 of the upper stoppers 131 and the lower stoppers 132 may be set according to the maximum amount of being pressed by the tab terminal 200, when the tab terminal 200 and the blade terminal 100 are connected.

More specifically, the upper stoppers 131 and the lower stoppers 132 may prevent the movable contact portion 128 from being deformed beyond the elastic limit by the tab terminal 200 when the tab terminal 200 and the blade terminal 100 are incompletely connected. Accordingly, when the tab terminal 200 is separated from the blade terminal 100 and the load by the tab terminal 200 is removed, the movable contact portion 128 may return to its original shape.

In addition, the upper stoppers 131 and the lower stoppers 132 may protect the front contact portions 129a and the rear contact portions 129b from the vibration of the tab terminal 200 in case of a large vibration of the vehicle body, so that it may be possible to maintain a stable connection state between the tab terminal 200 and the blade terminal 100 accordingly.

Although the embodiments of the present disclosure have been described in detail above, terms or words used in the present specification and claims should not be construed as being limited to a conventional or dictionary meaning. In addition, since configurations illustrated in the embodiments and the drawings described herein are only exemplary embodiments of the present disclosure, the scope of the present disclosure is not limited to the above-described embodiments. Furthermore, it is noted that various modifications and improvements by those skilled in the art using the basic concept of the present disclosure defined in the following claims is included in the scope of the present disclosure.

What is claimed is:

1. An electrical connection device for a vehicle, the device comprising:
    a male connector housing having a blade terminal mounting portion;
    a female connector housing configured to couple to the male connector housing and having a tab terminal mounting portion;
    a blade terminal mounted in the blade terminal mounting portion; and
    a tab terminal mounted in the tab terminal mounting portion and configured to connect to the blade terminal when the male connector housing and the female connector housing are coupled to each other;
    wherein the blade terminal comprises:
        a terminal body having a first connection portion configured to accomplish electrical connection with the tab terminal; and
        a contact spring assembled in a state of being inserted into an inner side of the first connection portion and configured to connect the terminal body and the tab terminal to each other by being brought into contact with the tab terminal when the tab terminal is inserted into the inner side of the first connection portion;
    wherein the contact spring comprises:
        a fixed contact portion configured to be elastically brought into contact with an inner circumferential surface of the first connection portion in a state of being disposed at the inner side of the first connection portion, the fixed contact portion having a U-shaped cross section and configured to be inserted in a state of being compressed by being pressed when assembled by being inserted into the inner side of the first connection portion; and
        a pair of movable contact portions integrally formed on upper and lower portions, respectively, of the fixed contact portion and configured to be elastically brought into contact with an outer circumferential surface of the tab terminal in a state of being pressed by the outer circumferential surface of the tab terminal inserted into the inner side of the first connection portion;
    wherein each of the movable contact portions has a rear end and side ends separated from the fixed contact portion;
    wherein each of the movable contact portions comprises a plurality of contact beams having front ends integrally formed with the fixed contact portion, respectively, and rear ends connected to each other;
    wherein each of the contact beams has a front contact portion and a rear contact portion formed by bending a central portion thereof such that a height of the front contact portion is smaller than a height of the rear contact portion, the heights of the front contact portion and the rear contact portion being determined with the inner circumferential surface of the first connection portion as a reference;
    wherein the front contact portion and the rear contact portion are protrudingly formed convexly toward an opposite side of the inner circumferential surface of the first connection portion at a center portion of the contact beam and each is configured to elastically press the outer circumferential surface of the tab terminal by elastic restoring force generated while being pressed by the outer circumferential surface of the tab terminal that is being inserted into the inner side of the first connection portion;
    wherein the rear contact portion is disposed at a regular distance at a rear side of the front contact portion;
    wherein the tab terminal is configured to be brought into contact with the front contact portion and then with the rear contact portion when being inserted into the inner side of the first connection portion; and
    wherein the fixed contact portion comprises:
        an upper plate configured to be elastically brought into contact with an upper inner circumferential surface of the first connection portion;
        a lower plate configured to be elastically brought into contact with a lower inner circumferential surface of the first connection portion; and
        a center plate bent in an arc shape at a rear end of the upper plate and a rear end of the lower plate and connecting the rear end of the upper plate and the rear end of the lower plate to each other.

2. The device of claim 1, wherein the first connection portion has a U-shaped cross section and comprises a front opening portion at a front surface and a pair of side opening portions at side surfaces, the front opening portion being configured to receive the tab terminal therein.

3. The device of claim 2, wherein:
    fixing grooves disposed on opposite side opening portions are formed on the side surfaces of the first connection portion, respectively; and
    side surface fixing portions configured to be correspondingly inserted into and assembled with the fixing grooves are formed on the upper plate and the lower plate, respectively.

4. The device of claim 3, wherein:
    front fixing portions configured to be hooked by the front surface of the first connection portion and brought into close contact with the first connection portion are formed on the upper plate and the lower plate, respectively; and the front fixing portions of the upper plate and the front fixing portions of the lower plate are disposed on opposite sides of the front opening portion, respectively.

5. The device of claim 1, wherein upper stoppers bent in downward directions are formed on a left side surface and a right side surface of the upper plate, respectively, and lower stoppers bent in upward directions are formed on the left side surface and the right side surface of the lower plate, respectively.

6. The device of claim 1, wherein the terminal body comprises:
a central body portion; and
the first connection portion and a second connection portion formed on opposite sides of the central body portion, wherein the second connection portion is disposed at a position opposite to the first connection portion.

7. The device of claim 6, wherein the second connection portion is formed in a same shape as the first connection portion.

8. The device of claim 7, further comprising a contact spring mounted in an inside of the second connection portion.

9. A vehicle comprising:
a vehicle body;
an electric and electronic device provided in the vehicle body; and
an electrical connection device electrically connected to the electric and electronic device, the electrical connection device comprising:
a male connector housing having a blade terminal mounting portion;
a female connector housing configured to couple to the male connector housing and having a tab terminal mounting portion;
a tab terminal mounted in the tab terminal mounting portion; and
a blade terminal mounted in the blade terminal mounting portion, wherein the tab terminal is configured to connect to the blade terminal when the male connector housing and the female connector housing are coupled to each other, and wherein the blade terminal comprises a terminal body having a first connection portion configured to accomplish electrical connection with the tab terminal and a contact spring assembled in a state of being inserted into an inner side of the first connection portion and configured to connect the terminal body and the tab terminal to each other by being brought into contact with the tab terminal when the tab terminal is inserted into the inner side of the first connection portion, wherein the contact spring comprises:
a fixed contact portion configured to be elastically brought into contact with an inner circumferential surface of the first connection portion in a state of being disposed at the inner side of the first connection portion, the fixed contact portion having a U-shaped cross section and configured to be inserted in a state of being compressed by being pressed when assembled by being inserted into the inner side of the first connection portion; and
a pair of movable contact portions integrally formed on upper and lower portions, respectively, of the fixed contact portion and configured to be elastically brought into contact with an outer circumferential surface of the tab terminal in a state of being pressed by the outer circumferential surface of the tab terminal inserted into the inner side of the first connection portion;
wherein each of the movable contact portions has a rear end and side ends separated from the fixed contact portion;
wherein each of the movable contact portions comprises a plurality of contact beams having front ends integrally formed with the fixed contact portion, respectively, and rear ends connected to each other;
wherein each of the contact beams has a front contact portion and a rear contact portion formed by bending a central portion thereof such that a height of the front contact portion is smaller than a height of the rear contact portion, the heights of the front contact portion and the rear contact portion being determined with the inner circumferential surface of the first connection portion as a reference;
wherein the front contact portion and the rear contact portion are protrudingly formed convexly toward an opposite side of the inner circumferential surface of the first connection portion at a center portion of the contact beam and each is configured to elastically press the outer circumferential surface of the tab terminal by elastic restoring force generated while being pressed by the outer circumferential surface of the tab terminal that is being inserted into the inner side of the first connection portion;
wherein the rear contact portion is disposed at a regular distance at a rear side of the front contact portion;
wherein the tab terminal is configured to be brought into contact with the front contact portion and then with the rear contact portion when being inserted into the inner side of the first connection portion; and
wherein the fixed contact portion comprises:
an upper plate configured to be elastically brought into contact with an upper inner circumferential surface of the first connection portion;
a lower plate configured to be elastically brought into contact with a lower inner circumferential surface of the first connection portion; and
a center plate bent in an arc shape at a rear end of the upper plate and a rear end of the lower plate and connecting the rear end of the upper plate and the rear end of the lower plate to each other.

10. The vehicle of claim 9, wherein the first connection portion has a U-shaped cross section and comprises a front opening portion at a front surface and a pair of side opening portions at side surfaces, the front opening portion being configured to receive the tab terminal therein.

11. The vehicle of claim 10, wherein:
fixing grooves disposed on opposite side opening portions are formed on the side surfaces of the first connection portion, respectively; and
side surface fixing portions configured to be correspondingly inserted into and assembled with the fixing grooves are formed on the upper plate and the lower plate, respectively.

12. The vehicle of claim 11, wherein:
front fixing portions configured to be hooked by the front surface of the first connection portion and brought into close contact with the first connection portion are formed on the upper plate and the lower plate, respectively; and the front fixing portions of the upper plate and the front fixing portions of the lower plate are disposed on opposite sides of the front opening portion, respectively.

13. The vehicle of claim 9, wherein upper stoppers bent in downward directions are formed on a left side surface and a right side surface of the upper plate, respectively, and lower stoppers bent in upward directions are formed on the left side surface and the right side surface of the lower plate, respectively.

14. An electrical connection device for a vehicle, the device comprising:
a male connector housing having a blade terminal mounting portion;
a female connector housing configured to couple to the male connector housing and having a tab terminal mounting portion;
a blade terminal mounted in the blade terminal mounting portion; and
a tab terminal mounted in the tab terminal mounting portion and configured to connect to the blade terminal when the male connector housing and the female connector housing are coupled to each other;
wherein the blade terminal comprises:
a terminal body having a first connection portion configured to accomplish electrical connection with the tab terminal; and
a contact spring assembled in a state of being inserted into an inner side of the first connection portion and configured to connect the terminal body and the tab terminal to each other by being brought into contact with the tab terminal when the tab terminal is inserted into the inner side of the first connection portion;
wherein the contact spring comprises:
a fixed contact portion configured to be elastically brought into contact with an inner circumferential surface of the first connection portion in a state of being disposed at the inner side of the first connection portion, the fixed contact portion having a U-shaped cross section and configured to be inserted in a state of being compressed by being pressed when assembled by being inserted into the inner side of the first connection portion; and
a pair of movable contact portions integrally formed on upper and lower portions, respectively, of the fixed contact portion and configured to be elastically brought into contact with an outer circumferential surface of the tab terminal in a state of being pressed by the outer circumferential surface of the tab terminal inserted into the inner side of the first connection portion;
wherein each of the movable contact portions has a rear end and side ends separated from the fixed contact portion;
wherein each of the movable contact portions comprises a plurality of contact beams having front ends integrally formed with the fixed contact portion, respectively, and rear ends connected to each other;
wherein each of the contact beams has a single front contact portion and a single rear contact portion such that each of the contact beams has an approximately W-shaped sectional structure in which a height of the front contact portion is smaller than a height of the rear contact portion, the heights of the front contact portion and the rear contact portion being determined with the inner circumferential surface of the first connection portion as a reference; and
wherein the fixed contact portion comprises:
an upper plate configured to be elastically brought into contact with an upper inner circumferential surface of the first connection portion;
a lower plate configured to be elastically brought into contact with a lower inner circumferential surface of the first connection portion; and
a center plate bent in an arc shape at a rear end of the upper plate and a rear end of the lower plate and connecting the rear end of the upper plate and the rear end of the lower plate to each other.

15. The device of claim 14, wherein:
the front contact portion and the rear contact portion are protrudingly formed convexly toward an opposite side of the inner circumferential surface of the first connection portion at a center portion of the contact beam to define the approximately W-shaped sectional structure and each is configured to elastically press the outer circumferential surface of the tab terminal by elastic restoring force generated while being pressed by the outer circumferential surface of the tab terminal that is being inserted into the inner side of the first connection portion;
the rear contact portion is disposed at a regular distance at a rear side of the front contact portion; and
the tab terminal is configured to be brought into contact with the front contact portion and then with the rear contact portion when being inserted into the inner side of the first connection portion.

16. The device of claim 14, wherein the first connection portion has a U-shaped cross section and comprises a front opening portion at a front surface and a pair of side opening portions at side surfaces, the front opening portion being configured to receive the tab terminal therein.

17. The device of claim 16, wherein:
fixing grooves disposed on opposite side opening portions are formed on the side surfaces of the first connection portion, respectively;
side surface fixing portions configured to be correspondingly inserted into and assembled with the fixing grooves are formed on the upper plate and the lower plate, respectively;
front fixing portions configured to be hooked by the front surface of the first connection portion and brought into close contact with the first connection portion are formed on the upper plate and the lower plate, respectively;
the front fixing portions of the upper plate and the front fixing portions of the lower plate are disposed on opposite sides of the front opening portion, respectively; and
upper stoppers bent in downward directions are formed on a left side surface and a right side surface of the upper plate, respectively, and lower stoppers bent in upward directions are formed on the left side surface and the right side surface of the lower plate, respectively.

* * * * *